(12) United States Patent
Jiang et al.

(10) Patent No.: US 9,075,183 B2
(45) Date of Patent: Jul. 7, 2015

(54) OPTICAL FIBERS WITH TRUNCATED CORES

(75) Inventors: Xinli Jiang, Shrewsbury, MA (US); Jinkee Kim, Norcross, GA (US); George Oulundsen, Belchertown, MA (US); Yi Sun, Suwanee, GA (US); Durgesh S. Vaidya, Southbridge, MA (US); Man F. Yan, Berkeley Heights, NJ (US)

(73) Assignee: OFS FITEL, LLC, Norcross, CA (US)

( * ) Notice: Subject to any disclaimer, the term of this patent is extended or adjusted under 35 U.S.C. 154(b) by 944 days.

(21) Appl. No.: 13/031,722

(22) Filed: Feb. 22, 2011

(65) Prior Publication Data

US 2011/0243519 A1    Oct. 6, 2011

Related U.S. Application Data

(63) Continuation-in-part of application No. 12/583,212, filed on Aug. 17, 2009, now Pat. No. 8,520,994.

(60) Provisional application No. 61/306,607, filed on Feb. 22, 2010.

(51) Int. Cl.
  *G02B 6/028* (2006.01)
  *G02B 6/02* (2006.01)
  *G02B 6/036* (2006.01)
  *G02B 6/14* (2006.01)

(52) U.S. Cl.
  CPC .......... *G02B 6/02023* (2013.01); *G02B 6/0288* (2013.01); *G02B 6/0365* (2013.01); *G02B 6/14* (2013.01)

(58) Field of Classification Search
  None
  See application file for complete search history.

(56) References Cited

U.S. PATENT DOCUMENTS

| | | | | |
|---|---|---|---|---|
| 3,843,228 A * | 10/1974 | Yoshiyagawa et al. | ....... | 385/124 |
| 4,176,911 A * | 12/1979 | Marcatili et al. | .............. | 385/124 |
| 5,802,235 A * | 9/1998 | Akasaka | ....................... | 385/123 |
| 6,266,467 B1 * | 7/2001 | Kato et al. | .................... | 385/123 |
| 6,280,850 B1 * | 8/2001 | Oh et al. | ...................... | 428/428 |
| 6,658,190 B2 * | 12/2003 | Hirano et al. | ................. | 385/124 |

(Continued)

FOREIGN PATENT DOCUMENTS

JP          8304636 A       11/1996

OTHER PUBLICATIONS

Jacomme L: "Modal dispersion in multimode graded-index fibers", Applied Optics, Optical Society of America, vol. 14, No. 11, Nov. 1, 1975, pp. 2578-2584, XP001623442, ISSN: 0003-6935—p. 2583, paragraph B; figure 9.

Primary Examiner — Michelle R Connelly
Assistant Examiner — John M Bedtelyon (57) ABSTRACT

Optical fiber designs are depicted with a core having an alpha profile inner portion and a steep vertical step between the core and a cladding with no shoulder, referred to herein as a truncated core. A further aspect of this invention can include a trench between the truncated core and cladding. In this embodiment, the core performs as not only as the primary light guiding structure, but now also functions essentially the same as that of a trench structure. Thus, what was formally a trench can now be much less negative or even positive. Another embodiment of the present invention includes an optical fiber having a truncated core with the addition of a ledge or shoulder between the core and vertical step, followed directly by a cladding.

5 Claims, 8 Drawing Sheets

(56) References Cited

U.S. PATENT DOCUMENTS

| | | | |
|---|---|---|---|
| 6,681,072 B2* | 1/2004 | Nagayama et al. | 385/127 |
| 7,233,727 B2* | 6/2007 | Hirano et al. | 385/126 |
| 7,613,374 B2* | 11/2009 | Imamura | 385/124 |
| 7,668,428 B2* | 2/2010 | Miyabe et al. | 385/125 |
| 7,773,845 B2* | 8/2010 | Imamura | 385/124 |
| 8,737,791 B2* | 5/2014 | Jiang et al. | 385/124 |
| 2008/0166094 A1 | 7/2008 | Bookbinder et al. | |
| 2009/0092365 A1* | 4/2009 | Donlagic | 385/124 |

* cited by examiner

FIG. 1

(PRIOR ART)

OPTICAL FIBERS WITH TRUNCATED CORES

RELATED APPLICATIONS

This application claims priority from Provisional Application No. 61/306,607 filed Feb. 22, 2010, which is incorporated herein in its entirety. It is also a continuation-in-part of patent application Ser. No. 12/583,212, filed Aug. 17, 2009 by reference herein in their entirety.

FIELD OF THE INVENTION

The invention described and claimed in this application relates to multimode optical fibers designed for exceptional bend loss and modal dispersion characteristics.

BACKGROUND OF THE INVENTION

The tendency of optical fibers to leak optical energy when bent has been known since the infancy of the technology. It is well known that light follows a straight path but can be guided to some extent by providing a path, even a curved path, of high refractive index material surrounded by material of lower refractive index. However, in practice that principle is limited, and optical fibers often have bends with a curvature that exceeds the ability of the light guide to contain the light.

Controlling transmission characteristics when bent is an issue in nearly every practical optical fiber design. The initial approach, and still a common approach, is to prevent or minimize physical bends in the optical fiber. While this can be largely achieved in long hauls by designing a robust cable, or in shorter hauls by installing the optical fibers in microducts, in all cases the optical fiber must be terminated at each end. Thus even under the most favorable conditions, certain bending can be encountered at the optical fiber terminals.

Controlling bend loss can also be addressed by the physical design of the optical fiber itself. Thus, ring features or trench features, or combinations thereof, are commonly found at the outside of the optical fiber refractive index profiles to control bend losses. See for example, U.S. Pat. Nos. 4,691,990 and 4,852,968, and U.S. patent application Ser. No. 12/583,212, filed Aug. 17, 2009, all incorporated herein by reference.

In a conventional graded index multimode fiber, high order modes suffer greater loss than low order modes when the fiber is bent. In bend-optimized multimode fiber designs (BOMMF), a trench is located at the outer edge of the graded index core to minimize the bend loss of high order modes. As is well known in this art, a trench refers to an annular region of depressed index located in, and part of, the cladding region.

In typical optical fiber designs in which a negative trench is used to aid in controlling bend loss the negative trench is spaced from the edge of the alpha profile of the core by a shoulder. Typically the shoulder is silica (refractive index delta of zero). The width of the shoulder is a design variable used in combination with other design parameters to modify fiber characteristics. While these designs produce exceptional bend loss performance improvements are still sought.

STATEMENT OF THE INVENTION

We have discovered that the width of the shoulder or ledge may advantageously go to zero and with additional modifications to the profile one can maintain good bend loss performance with or without a trench. That discovery leads to a new and broad optical fiber design concept involving shifting the refractive index profile up so that the entire profile, including the trench, can be positive. The function formerly assigned to the trench feature may now be considered as part of the positive index core. In this design the core performs as not only as the primary light guiding structure, but now also functions essentially the same as that of a trench structure. What was formally a trench can now be much less negative or even positive. An optical fiber core having an alpha profile inner portion and a steep vertical step between the core and the cladding with no shoulder is referred to herein as a truncated core. A further aspect of this invention includes a trench between the truncated core and cladding.

Another embodiment of the present invention includes an optical fiber having a truncated core with the addition of a ledge or shoulder between the core and vertical step, followed directly by a cladding.

DETAILED DESCRIPTION

Bend loss occurs in both single mode and multimode optical fibers. Multimode optical fibers typically are used in communications over shorter distances such as in data centers, enterprise LAN, SAN, etc. The advantage of multimode fiber lies largely in the ability to couple this fiber with simple and cost effective sources. In the past these sources were mainly LEDs with a wavelength around 850 or 1300-nm. In the last decade, low cost Vertical Cavity Surface Emitting Laser (VCSEL) laser diodes with vertical resonators have become commercially widespread. These lasers enable effective coupling between the laser diode and optical fibers and also are capable of very high modulation rates, e.g., up to 10.3125 Gbps. For 40/100-GBE multimode fiber applications like high performance in computing, data center and SAN applications, IEEE Std. 802.3ba™-2010 proposes standards for parallel VCSEL arrays, (4 and 10 channels) with individual channel rates of 10.3125 Gbps.

Performance issues for optical fibers under bent conditions have generally been considered to involve generalized optical power loss, due to leakage of light from the optical fiber at the location of the bend. The influence of modal structure changes on bend loss is generally overlooked.

In single mode optical fibers general power loss is the primary consideration, since all leakage involves light in the fundamental mode of the optical fiber. However, in multi-mode optical fiber the higher order modes suffer more loss than lower order modes due to differential effective refractive index. Also, the combination of higher order and lower order modes in a multimode optical fiber determines the bandwidth, and thus the signal carrying capacity, of the optical fiber.

Figure 1:
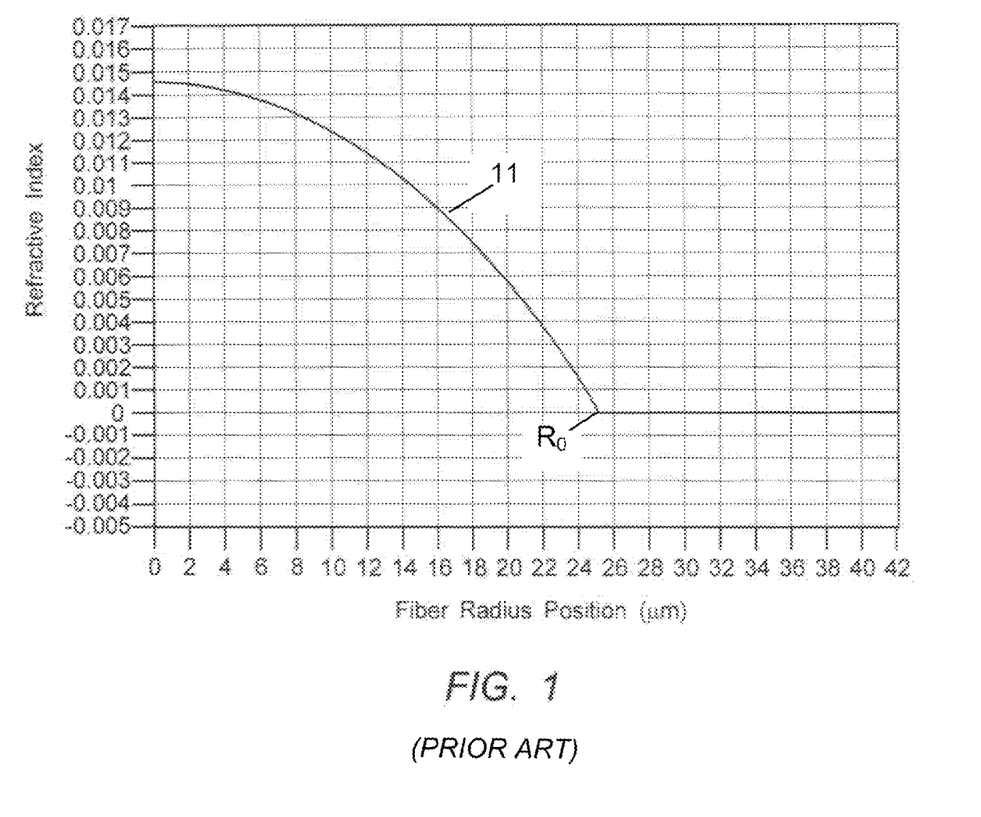
FIG. 1 is a plot showing a refractive index profile for a standard multimode optical fiber.

For high bandwidth, the group velocities of the various modes in multi-mode fibers should be as close to equal as possible. The differential group velocities can be controlled by grading the refractive index of the material comprising the core, which means specifying a functional form of the index as a function of the fiber radius. In a conventional multi-mode fiber, the design goal has been to achieve an α-shape, which is defined as:

$$n(r) = [n_1^2 - (n_1^2 - n_{clad}^2)(r/R_0)^\alpha]^{1/2} \quad (1)$$

where r is the radius of the fiber, $R_0$ is the radius of the core, $n_{clad}$ is the refractive index of the cladding, $n_1$ is refractive index at the center of core (r=0) and α is the power law profile parameter. This is the "ideal" α-shape (alpha core) profile, as used in the industry, where a has a value typically of 1.8 to 2.2. FIG. 1 illustrates a typical refractive index profile for a multimode optical fiber (MMF) with an alpha core 11. The alpha core extends radially out to $R_0$. $R_0$ is the point where the power law curve intersects zero delta refractive index.

Figure 2:
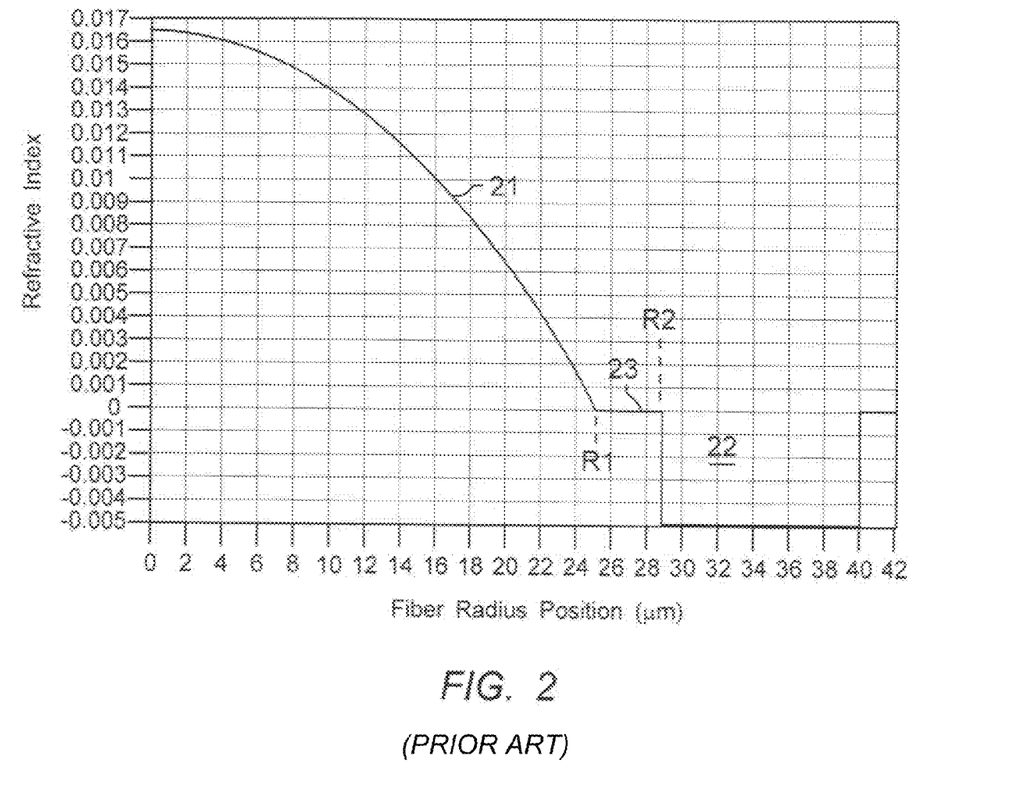
FIG. 2 is a similar plot for a multimode optical fiber having a trench to aid in bending performance.

Improvement in bend loss characteristics may be achieved by adding a trench to the refractive index profile. A trench is a down doped region, typically a fluorine doped region, with refractive index lower than pure silica, usually referred to as negative delta refractive index. FIG. 2 shows a refractive index profile for a MMF having an alpha core 21 having a radius $R_1$ from the center of the core, but with a trench 22 added to control bending loss. Between the trench and the alpha core is a shoulder 23 extending to a radius $R_2$ from the core center.

Figure 3:
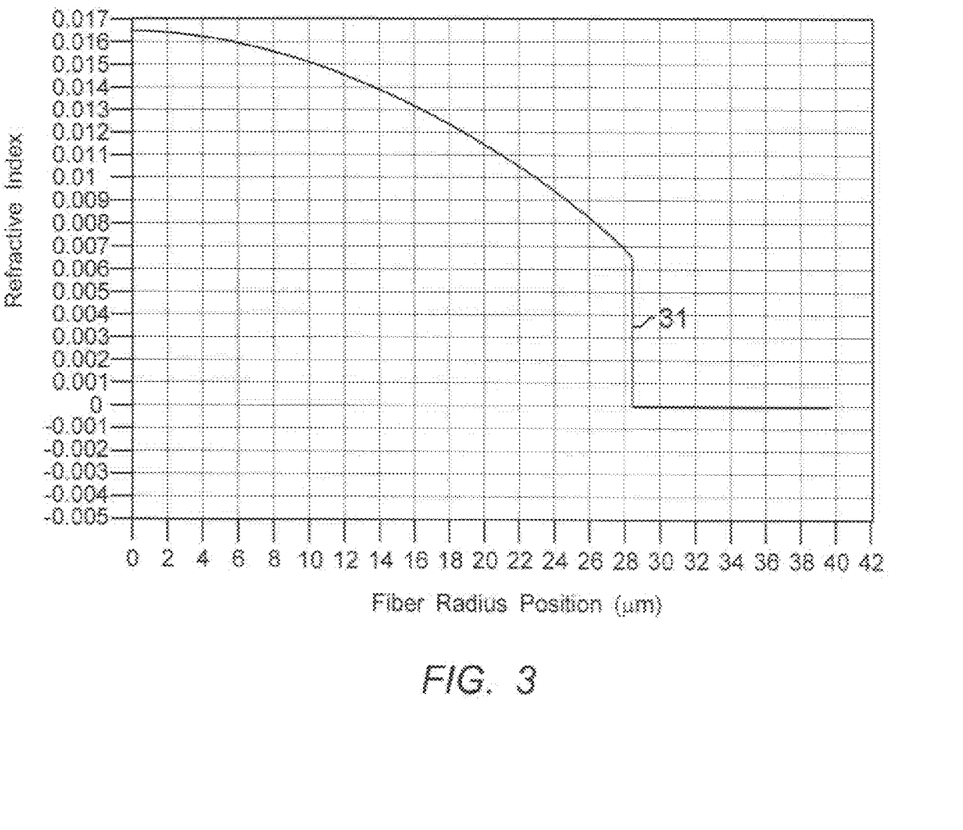
FIG. 3 shows a refractive index profile for an optical fiber having a truncated core, according to the invention, for controlling bend performance.

In the design of FIG. 2, compared with a conventional MMF (as shown in FIG. 1), the high order modes are influenced by the trench and effectively experience greater refractive index difference than in the case of a conventional MMF. It has been discovered that the trench 22 in the design of FIG. 2 is not necessary and can be eliminated. This produces the truncated core design that is characteristic of the invention. FIG. 3 shows a refractive index profile in which the core is truncated, resulting in a large vertical step 31. The step 31 serves the same function as the trench in the design of FIG. 2, that is, step 31 creates a large refractive index difference between the core light guiding portion of the fiber and the cladding. Among the advantages of this design is simplicity in fabrication, an advantage obtained by eliminating any negative refractive index regions.

Figure 4:
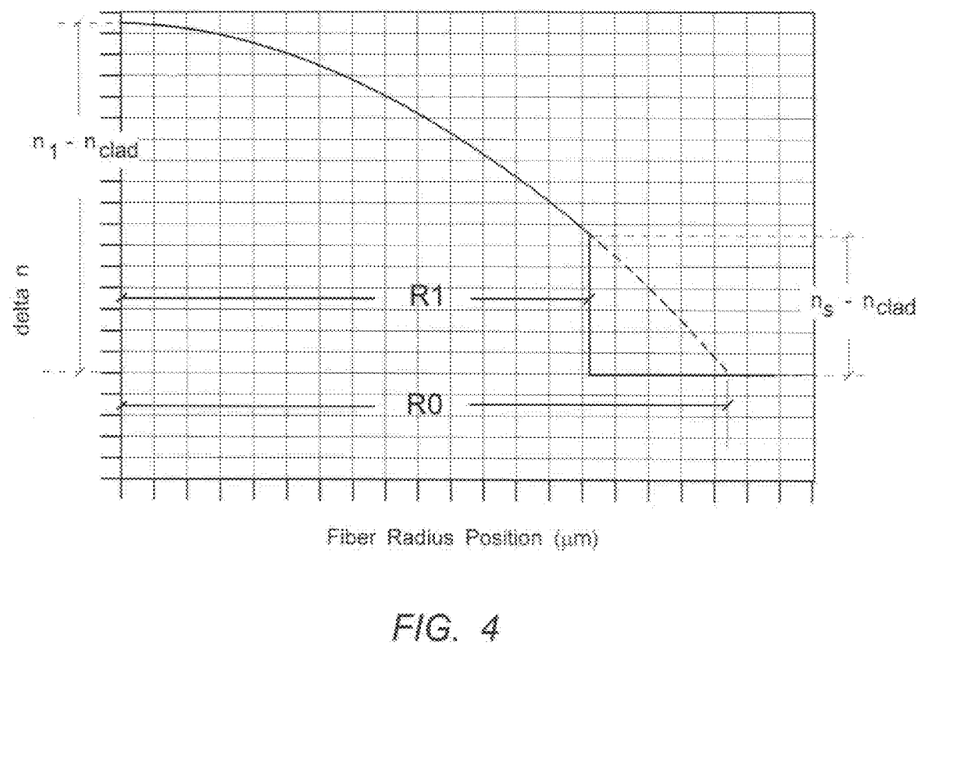
FIG. 4 is a schematic representation of a refractive index profile with a truncated core and showing the parameters relevant to defining a truncated core in accordance with one aspect of the invention.

The parameters used to define the truncated core are illustrated in FIG. 4. $R_0$ was defined earlier. $R_1$ is the physical core radius, i.e., the point where the core refractive index steps down from $n_s$ to the refractive index of the cladding region, $n_{clad}$. Refractive index delta n is the departure of the refractive index from $n_{clad}$. Refractive index $n_s$ is the index where the step begins, and $n_s - n_{clad}$ defines the step height in terms of refractive index delta. An aspect of the invention includes the cladding being made of silica, possibly doped or undoped. In such an instance the refractive index $n_{clad}$ would be approximately the same as that of the silica.

To replace the need for a trench, the height of the vertical step should be as large as a fraction of delta $n_1$ multiplied by $(n_1 - n_{clad})$. Specifically, the step height $n_s - n_{clad}$ should be at least 0.2 $(n_1 - n_{clad})$, and preferably at least 0.35 $(n_1 - n_{clad})$. For example, FIG. 3 shows a step height is 0.4 $(n_1 - n_{clad})$.

Suitable design parameters for the example of FIG. 3, and, for comparison, the examples illustrated in FIGS. 1 and 2, are given in Table I.

TABLE 1

| Design | FIG. 1 | FIG. 2 | FIG. 3 |
|---|---|---|---|
| Description | Conventional MMF | MMF with trench and shoulder | MMF with truncated core and vertical step |
| Graded index core diameter (μm) | 50 | 50 | 57.2 |
| Core Index | 0.0167 | 0.0145 | 0.0167 |
| Inner Wall diameter of trench (μm) | 50 | 57.8 | 57.2 |
| Delta n of Step or Trench | 0 | −0.005 | 0.006 |

For the design of FIG. 3, the refractive index profile can be expressed generally as:

$$n(r) = \begin{cases} [n_1^2 - (n_1^2 - n_{clad}^2)(r/R_0)^\alpha]^{1/2} & \text{where } r < R_1 \\ n_{clad} & \text{where } r < R_1 \end{cases} \quad (2)$$

In this expression $n_1$ is the refractive index at r=0, $n_{clad}$ is the refractive index of the cladding, and α is the power law profile parameter. $R_0$ is the radius position where $n(R_0) = n_{clad}$.

$R_1$ in the equation above can be determined by:

$$R_1 = R_0 * [(n_1^2 - n_s^2)/(n_1^2 - n_{clad}^2)]^{1/\alpha}$$

where $n_s$ is the maximum refractive index of the step between core and cladding.

An embodiment of the present invention includes delta $n_1$ falling between 0.005 and 0.03. According to an aspect of the invention, a preferred range for delta $n_1$ is 0.014 to 0.02.

In these designs it is preferred, but not essential, that the value of $R_1$ be in the range 10-34 microns.

Table II shows the macro bend loss at 850 nm of the 3 designs shown in FIGS. 1, 2 and 3. The bend loss of the multimode optical fibers were measured by wrapping 2 meter fiber samples around either 10 mm, 15 mm or 30 mm diameter mandrels designated 10 D, 15 D and 30 D respectively, using 2.5 turns or 10.5 turns designated as 2.5 T or 10.5 T respectively.

TABLE II

|  | 10D2.5T | 10D10.5T | 15D2.5T | 15D10.5T | 30D2.5T | 30D10.5T |
|---|---|---|---|---|---|---|
| FIG. 1 (dB) | 2.060 | 2.976 | 1.154 | 1.891 | 0.129 | 0.260 |
| FIG. 2 (dB) | 0.459 | 0.981 | 0.130 | 0.244 | 0.019 | 0.028 |
| FIG. 3 (dB) | 0.546 | 0.829 | 0.164 | 0.249 | 0.016 | 0.022 |

Figure 6:
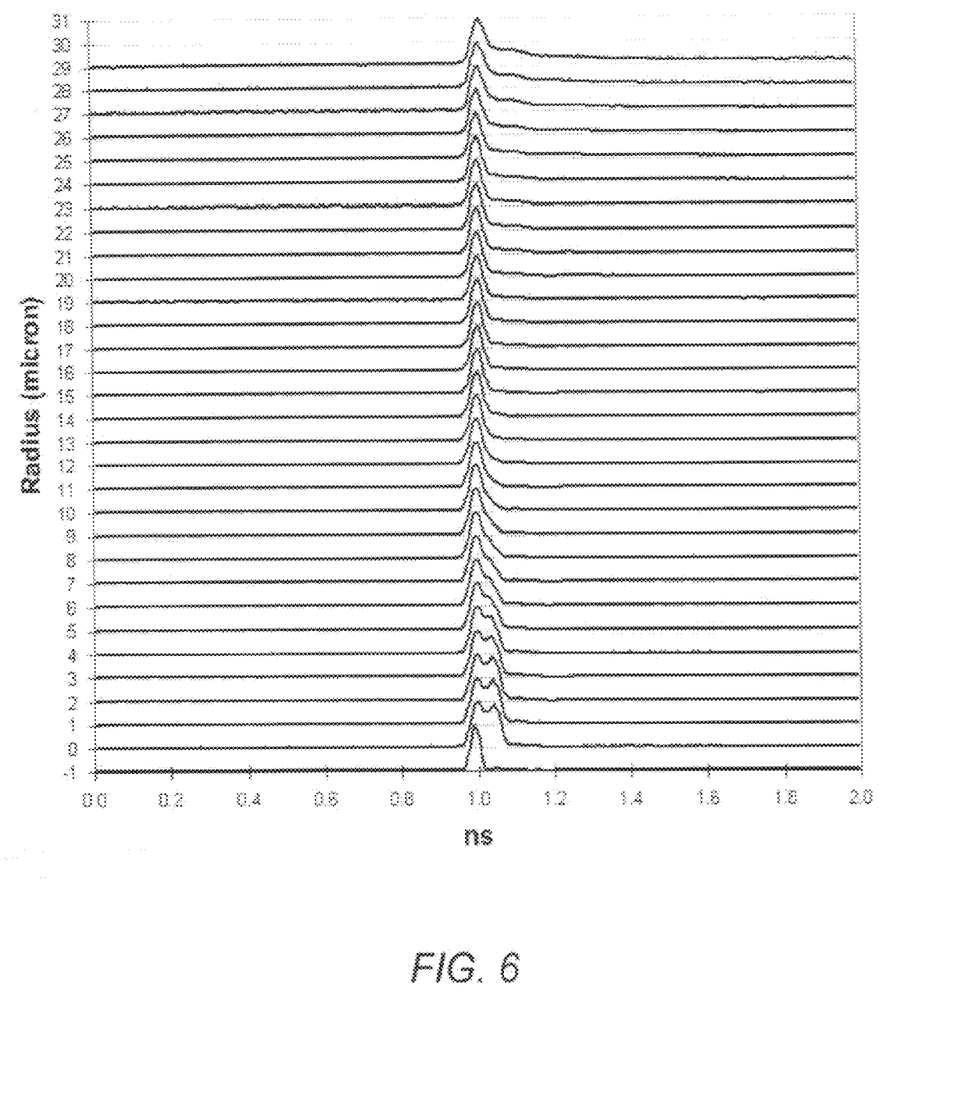
FIG. 6 shows a DMD trace from 0~28 micron radius position for the optical fiber design of FIG. 3.

A 430-meter sample of the design of FIG. 3 was tested on a HR-DMD bench. FIG. 6 shows the DMD trace from 0~28 micron radius position. Table III lists the DMD mask width and Effective Modal Bandwidth (EMB) values, which exceed the standards for OM3 specifications.

TABLE III

| | |
|---|---|
| MW18 (ps/m) | 0.136 |
| MW23 (ps/m) | 0.136 |
| SLW (ps/m) | 0.106 |
| MinEmbc (MHz__km) | 3896 |

Figure 5:
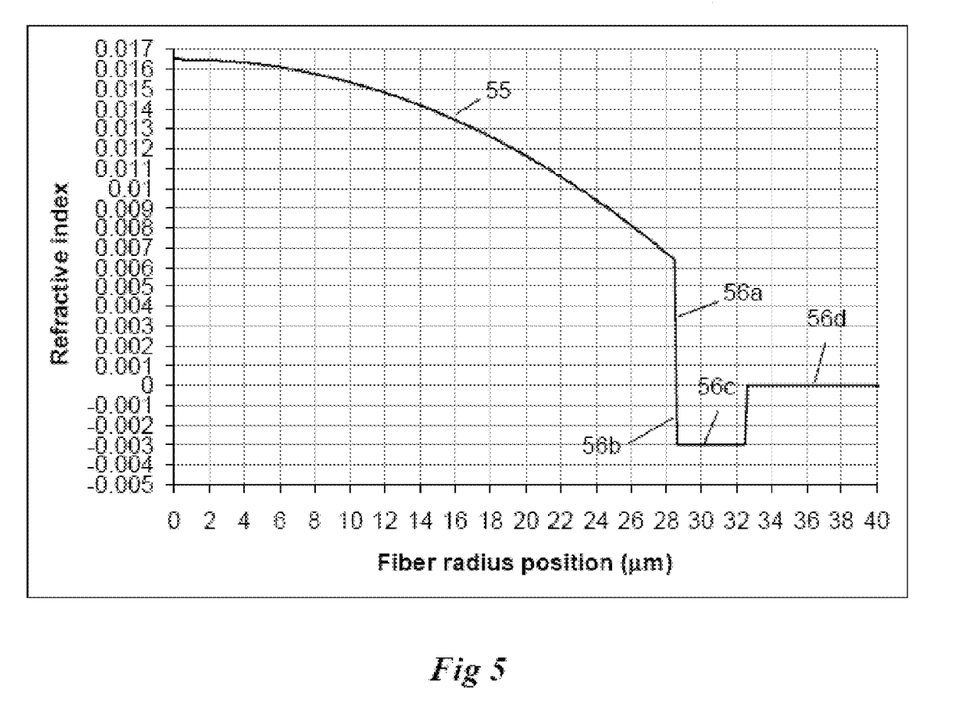
FIG. 5 shows a refractive index profile for an optical fiber having a modified truncated core.

An alternative embodiment of the invention is shown in FIG. 5. The alpha portion of the refractive index profile is shown at 55. The large step comprises a positive index portion 56a and a negative index portion 56b. The negative index portion 56b represents an enhancement to the large step 56a, and in some cases may further improve the bend performance of the design. In the typical truncated core design, the measured fiber core diameters (based on FOTP-176) are usually 3~5 μm greater than the physical core diameter (based on a refractive near field profile for example). Adding a first cladding region and a second cladding region outside the first cladding region with an index greater than the first cladding region aids in depleting cladding modes and controlling the measured core diameter. Therefore, as shown in FIG. 5, the region 56c would have an index of $n_{clad1}$ which is less than the index of region 56d with an index of $n_{clad2}$. An inherent limitation of the alpha core profile design is that high order modes are not properly compensated due to the abrupt change in refractive index at the core-clad boundary and coupling to cladding modes at the edge of the core. Thus the modal delay of high order modes deviates from low order and medium order modes. For conventional ideal alpha core MMF, such as OM3 and OM4 fibers, the differential mode attenuation of high order modes is high, which minimizes impact of high order modes on differential mode delay and eventually bandwidth. (OM3 and OM4 are well known MMF types defined in the International Electrotechnical Commission (IEC) and the Telecommunications Industry Association (TIA).) In MMF designed for low bend loss, the interaction of the higher order modes with the trench or large step (i.e. essentially any large index difference at the core edge) not only improved fiber bend performance, but it also severely changed propagation characteristics of high order modes. Consequently, controlling the differential mode delay of the higher order modes in bend insensitive MMF becomes very important and is more challenging than in conventional MMF. Thus, methods of equalizing modal delay of high order modes are needed for bend insensitive MMF (BIMMF) used in high speed digital transmission. In the current state of the art, high speed transmission for optical data systems is generally considered to be 10 Gb/s or greater.

We discovered that two different approaches can be practiced to mitigate the impact of BIMMF with large index changes at the core edge on high order modes. The first approach involves locating the step away from the core area to be utilized. In the high speed digital transmission application, 0-23 micron range for DMD test is specified in standard TIA/EIA-455-220. Therefore, in approach one the step at R1 would need to be at least 4 microns greater than 23 microns to insure good DMD behavior. In the example of FIG. 3, the radius position of the step 31 is chosen to be 28.6 micron. The DMD of the design, as shown in FIG. 6, illustrates that the step has very little impact on the 0-23 micron DMD value.

Figure 7:
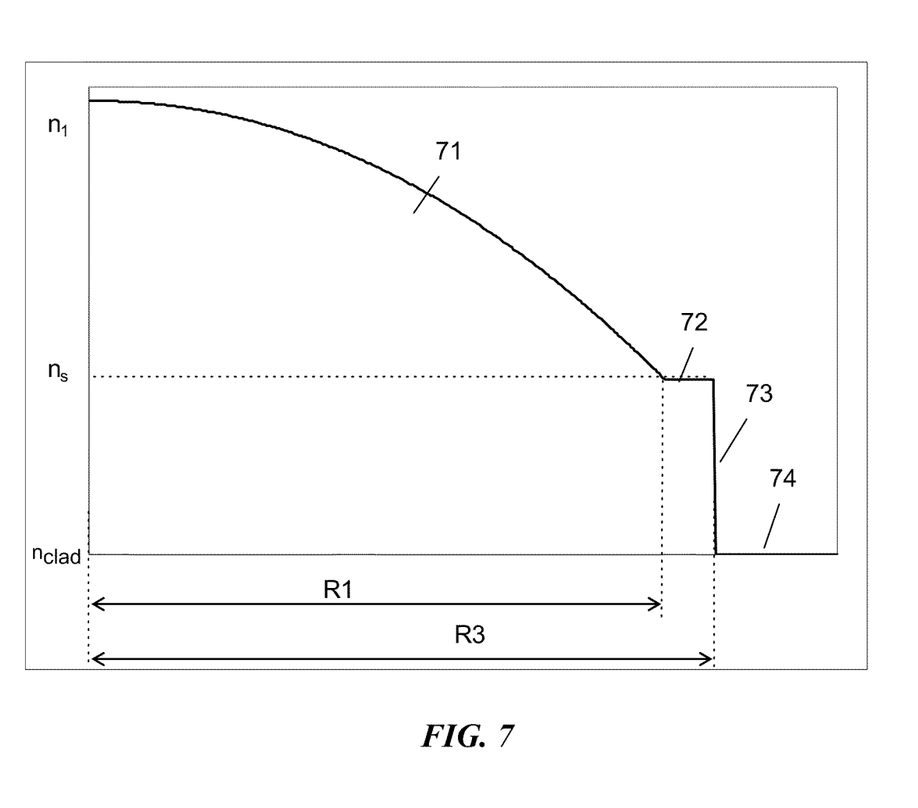
FIG. 7 shows a refractive index profile for an optical fiber having a truncated core modified by the addition of a ledge.

The second approach is to add a ledge with proper width between the core edge and the step to compensate the impact of the step. This is shown in FIG. 7. The alpha portion of the refractive index profile is designated 71, the step forming the truncated core edge 73, is shifted away from the core center by distance R3−R1 to form ledge 72. Distance R3−R1 is preferably in the range 1 to 4 microns. As shown, the first approach shown in FIG. 3 has no ledge and therefore R3−R1 would be zero.

The optical fiber designs described above are advantageously used in systems having Vertical Cavity Surface Emitting Lasers (VCSELs) as the optical source. Truncated core optical fibers coupled to VCSEL sources exhibit exceptional system performance as demonstrated in the following examples.

Figure 8:
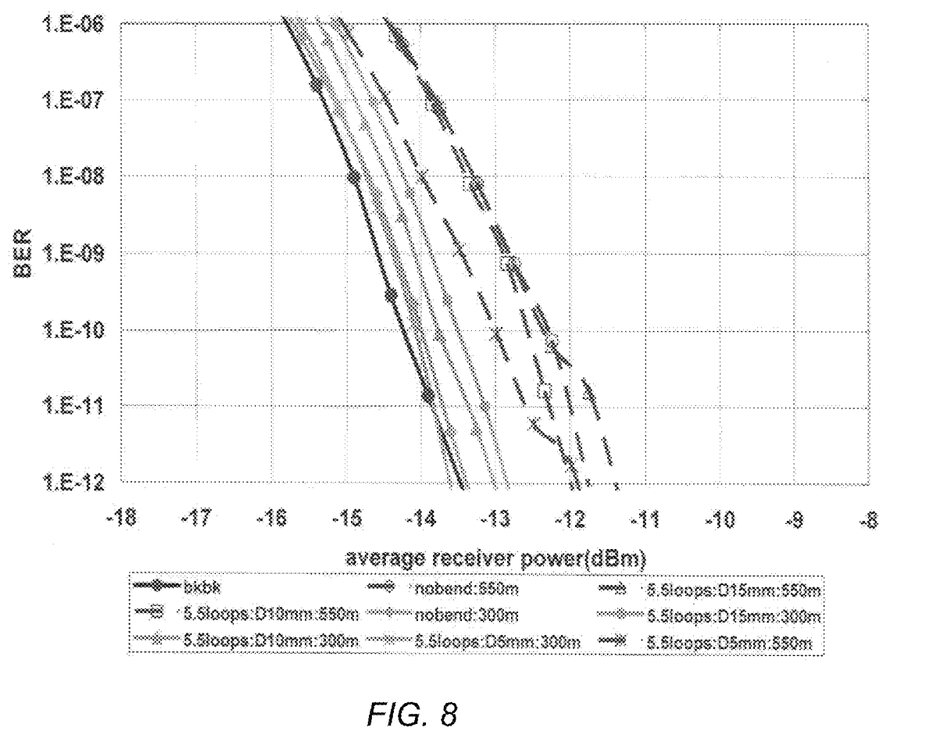
FIG. 8 shows Bit Error Rate (BER) waterfall curves for a truncated core optical fiber operating over a 300 m and 550 m optical link.

FIG. 8 shows Bit Error Rate (BER) waterfall curves for an optical fiber with a truncated core (FIG. 3) over a 300 m and 550 m optical link. The optical fiber has a 0-23 um DMD mask width value of 0.136 ps/m. The bit rate is 10.3125 Gbps, encoded with a pseudo-random bit sequence (PRBS) of $2^{31}-1$ (PRBS31). The VCSEL has a root mean square (RMS) spectral width of 0.24 nm and an encircled flux (EF) of 14% at 4.5 um and 98% at 19 um. The BER waterfall curves show excellent performance over both 300 m and 550 m long transmission, with and without 5.5 loops of tight bends in the link at three different bending diameters, 15 mm, 10 mm and 5 mm.

In addition to improved bending loss, as described above, optical fiber transmission performance is typically characterized also by channel insertion loss (CHIL) and dispersion power penalty (DSP). Channel insertion loss is defined as the summation of the attenuation, connector loss and bending loss when bending exists in the link length. These three parameters of merit are summarized in the Table IV. The data is given for the VCSEL source just described as well as for a system comprising a truncated core optical fiber (like one shown in FIG. 3) coupled to a VCSEL with a RMS spectral width of 0.38 nm and EF of 8.5% at 4.5 um and 95% at 19 um.

TABLE IV

| | length | bending diameter | CHIL (dB) | 5.5 loops bending loss (dB) | DSP (dB) | Total (dB) |
|---|---|---|---|---|---|---|
| VCSEL | 300 m | nobend | 0.69 | 0 | 0.7 | 1.39 |
| (RMS ~0.24 nm, | | 15 mm | 0.78 | 0.09 | 0.5 | 1.28 |
| EF 14% at 4.5 | | 10 mm | 0.86 | 0.17 | 0.1 | 0.96 |
| um and 98% at | | 5 mm | 1.73 | 1.04 | 0 | 1.73 |
| 19 um) | 550 m | nobend | 1.24 | 0 | 2.1 | 3.34 |
| | | 15 mm | 1.3 | 0.06 | 1.8 | 3.1 |
| | | 10 mm | 1.36 | 0.12 | 1.5 | 2.86 |
| | | 5 mm | 2.17 | 0.93 | 1.3 | 3.47 |
| VCSEL | 300 m | nobend | 0.68 | 0 | 2 | 2.68 |
| (RMS ~0.38 nm, | | 15 mm | 0.74 | 0.06 | 1.8 | 2.54 |
| EF 8.5% at 4.5 | | 10 mm | 0.89 | 0.21 | 1.4 | 2.29 |
| um and 95% at | | | | | | |
| 19 um) | | | | | | |

Figure 9:
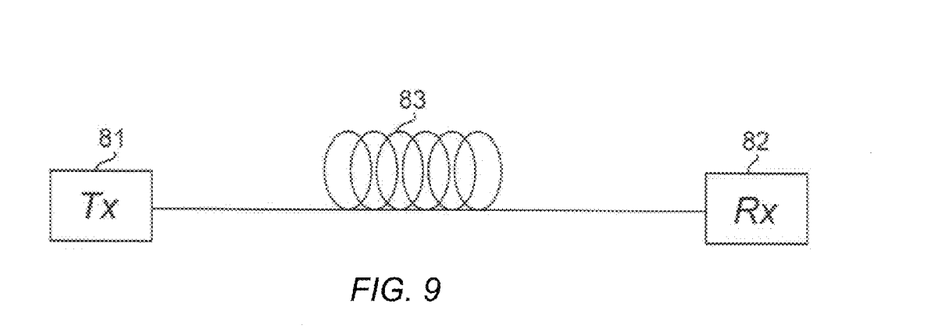
FIG. 9 is a schematic representation of a transmission link using optical fibers with truncated cores according to the invention.

FIG. 9 is a schematic representation of a transmission link between laser transmitter 81 and optical receiver 82 using optical fiber 83 having a design according to the invention.

In concluding the detailed description, it should be noted that it will be obvious to those skilled in the art that many variations and modifications may be made to the preferred embodiment without substantial departure from the principles of the present invention. All such variations, modifications and equivalents are intended to be included herein as being within the scope of the present invention, as set forth in the following claims.

The invention claimed is:
1. A multimode optical fiber comprising in cross section:
   a core having a first portion that extends from a center of the cross section to a radius $R_1$, the core having a refractive index $n_1$ at the center of the cross section and a refractive index $n_s$ at $R_1$; and an un-doped cladding surrounding and in contact with the core, the cladding having a refractive index $n_{clad}$, wherein the cladding consists essentially of pure silica, wherein the first portion has an alpha core profile and a step region at $R_1$ where the refractive index difference from the cladding of $n_s - n_{clad}$ is at least $0.2(n_1 - n_{clad})$, and wherein $n_1 - n_{clad}$ is less than 0.03.

2. The multi-mode optical fiber of claim 1 where $n_s - n_{clad}$ is at least $0.35 (n_1 - n_{clad})$.

3. The multi-mode optical fiber of claim 2 where $n_1 - n_{clad}$ is in the range of 0.014 to 0.02.

4. The multi-mode optical fiber of claim 1 where $R_1$ is in the range of 14-38 microns.

5. An optical system comprising:
a) a laser transmitter,
b) an optical receiver, and
c) the multimode optical fiber of claim 1 coupled between the transmitter and receiver.

* * * * *